March 21, 1944.    H. BLASIER    2,344,672

METHOD OF MEASURING EARTH POTENTIALS

Filed March 23, 1940

INVENTOR.
Herbert Blasier
BY
P. W. Weilein
ATTORNEY.

Patented Mar. 21, 1944

2,344,672

UNITED STATES PATENT OFFICE 2,344,672

METHOD OF MEASURING EARTH POTENTIALS

Herbert Blasier, Arcadia, Calif.

Application March 23, 1940, Serial No. 325,593

9 Claims. (Cl. 175—183)

This invention relates to the detection and measurement of potential differences between conducting bodies and electrolytes in which they are buried. More specifically, this invention has to do with the measurement of potentials between buried metal structures and the surrounding earth for the purpose of combating corrosion caused by currents flowing between the metal and the earth.

Metallic bodies in contact with an electrolyte exhibit a potential difference with the electrolyte which is a function of the position of the metal in the electro-chemical series. Metallic structures buried in the earth can be considered as being equivalent to electrodes immersed in electrolyte. However, in the case of buried metal structures there are often quite large potential differences between the metal bodies and the surrounding earth caused by stray currents from street railway return systems and other causes.

Galvanic action and the flow of current between buried metal structures and the earth are responsible for a large portion of the corrosion which takes place in buried metal pipes and sheaths. It has been customary, in the past, in systematic elimination of corrosion, to measure the potential between points in the earth and buried metallic structures by the insertion of an electrode into the earth and measurement of the potential between the electrode and the metal structure by means of a voltmeter or an electronic device. However, as the electrode itself is a buried metal structure, the indicated voltage is really that between two electrodes in an electrolyte. For that reason, it has been customary to use a lead electrode for measurements of potentials involving lead sheaths, and an iron electrode matching as closely as possible in composition the pipes being tested when testing gas or water pipes. Despite these precautions, variations in composition of the buried structures introduce errors. For instance, the potential between electrolytic lead and bar lead is appreciable, and the mechanical treatment lead has undergone before it is inserted in the electrolyte often gives it a galvanic action with respect to lead which has had a different mechanical treatment. Another source of error is the oxidation of the pipes or the iron electrodes, which give compounds having unpredictable galvanic action, which may introduce errors of the same order of magnitude as the differentials being measured, sometimes even resulting in a reversal of the apparent polarity.

It is seen therefore, that a large proportion of the error in measuring the potential between any metal structure immersed in an electrolyte is due to the use of an electrode of uncertain action which is not present under normal conditions when the test is not being made.

It is, therefore, an object of this invention to provide a method for the determination of the potentials between metal structures and an electrolyte which gives a true measure of that potential as it normally exists.

It is a further object of this invention to provide a method for the determination of the potentials existing between electrodes and electrolytes which are unaffected by the presence of a test electrode.

It is a further object of this invention to provide a method for the determination of the potentials existing between buried metal structures and portions of the earth which introduce no galvanic action from a test electrode.

It is a further object of this invention to eliminate the chemical composition of buried metal structures as a factor in the determination of potentials between those structures and the earth.

It is a further object of this invention to provide a method for the determination of potentials between buried metal structures and the earth which is unaffected by the surface conditions of the buried structures.

It is a further object of this invention to provide a method for determination of potentials between buried metal structures and the earth which will give indications which are more nearly related to the likelihood of corrosion than has been heretofore obtained.

It is a further object of this invention to provide a method of measuring the potentials in different points of the earth for the determination of the direction and intensity of stray currents therethrough.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Figure 1:
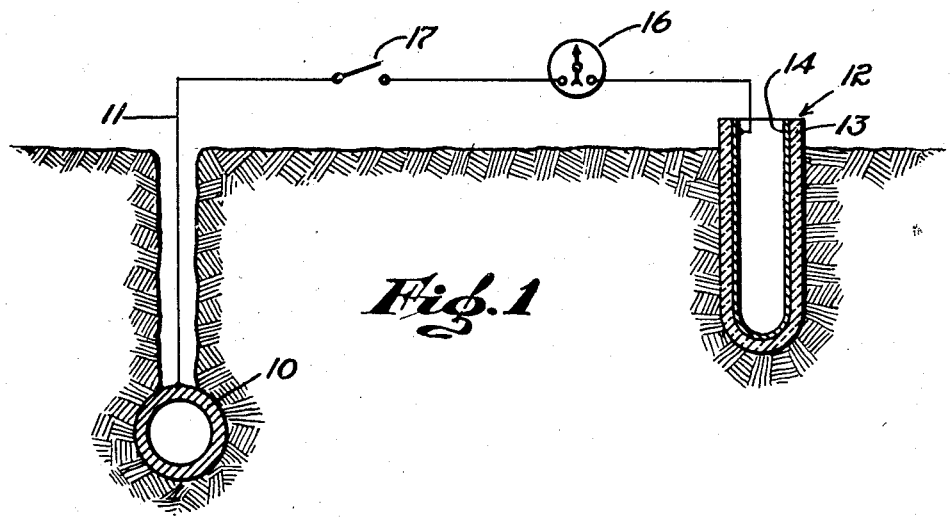
Figure 1 represents one mode of practising this invention.

Referring to the drawing, in Figure 1 the application of this invention to the determination of potential differences between a point in the ground and a buried metal structure is illustrated.

A buried metallic structure 10 is supplied with a conductor 11, and an electrode 12 is driven into the ground at the point where comparison with the potential of the structure 10 is desired. This electrode 12 consists of an insulating outer surface equipped with a conducting center. As an example, a glass tube 13, silver-plated on its interior, or otherwise equipped with a conducting inner surface 14 may be used. Or a metallic rod coated with a suitable dielectric may answer the purpose. It may be desirable, in some cases, to utilize a flat sheet of dielectric simply laid on the surface of the ground, the side of the sheet not in contact with the earth being supplied with a conducting surface.

Now, if the conductor 11 be connected to the metallic inner part 14 of the electrode 12, the potential of the inner part will be made equal to that of the metal structure 10. The electrode 12 is, in effect, a condenser, the two plates of the condenser being the earth and the inner coating, and the dielectric being the glass tube or coating 13. That being so, if the amount of electricity (coulombs) passing along the conductor when it is connected to the inner part 14 of the electrode be measured, a simple calculation will suffice to indicate the difference in potential of the outer and inner plates of the condenser, its capacity being known. Many quantity indicating means are known, and purely as an example, an impulse or ballistic galvanometer 16 and key 17 have been illustrated, the key serving to close the circuit, and the galvanometer deflecting according to the total quantity of electricity which flows. The technique is similar to that employed in measuring capacitances with a known potential impressed on a condenser. It has been found in practice that the capacitance of the condenser formed by the electrode and the earth is substantially constant, but if, for any reason, there is any doubt on this score, the familiar technique of impressing a known voltage across the "plates" of the condenser and observing the galvanometer deflection will give a basis from which to calculate the capacity.

It is to be understood, of course, that there are other methods of obtaining the potential difference between two plates of a condenser, all of which may be successfully employed as may be desired. For example, a condenser might well be placed in the line leading from the pipe 10 to the coating 14 of the electrode, and the voltage thereacross utilized to calculate the potential between the structure 10 and the point of insertion of the electrode 12 in the earth. Or, the charging current for the condenser formed by the earth and inner coating 14 can be made to flow through an inductance or resistance, and the voltage across the resistance or inductance used to give, utimately, the potential between the structure 10 and the point of insertion of the electrode 12. Various expedients will readily suggest themselves to those skilled in the art. It is to be understood farther, that by various methods of determining the instantaneous current, rather than the total quantity, information can be obtained as to the resistivity of the soil between the electrode and the buried metal structure. This information is useful because, in the case of electrolytic action, the damage done to underground structures is a function of current flow, which in turn is a function of the resistivity of the soil and the potentials between the soil and the metal structure.

It is seen, therefore, that there is provided a method for measuring potentials and resistivity between a buried metal structure and a point in the soil, which is independent of any electrode which can be said to have any galvanic effect on the accuracy of measurement. The method gives a value for the potential difference which is much more significant than one which is obtained by attempting to balance the galvanic action of an electrode with the galvanic action of the underground metal structures.

Figure 2:
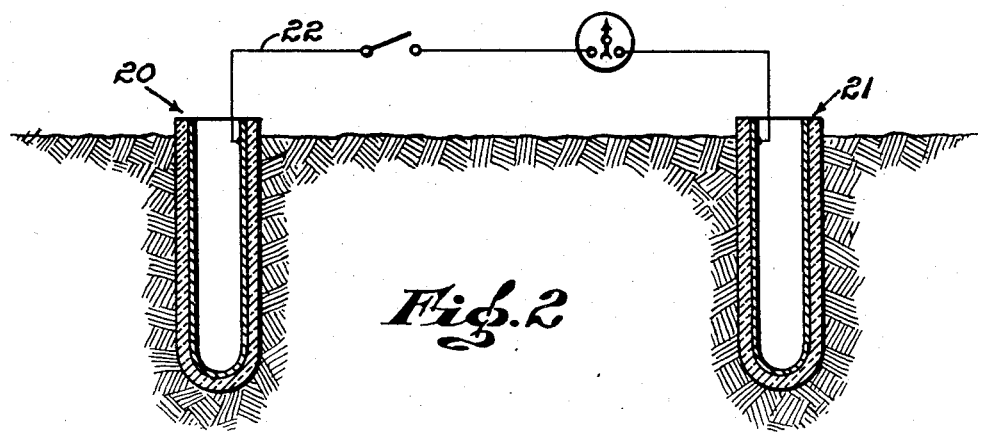
Figure 2 illustrates another application of my invention for a slightly different purpose.

In Figure 2 is shown another application of the method involved in this invention. In this figure, two electrodes 20 and 21, similar to those described in connection with Figure 1, are shown as inserted in the earth at separated points. If the inner coatings of the electrodes are connected together by a conductor 22, a current will flow along the conductor, if the electrodes are inserted in the earth at two points of differential potentials. Measurements will readily give the difference in potential between the two points at which the electrodes are inserted, and its direction. By suitable manipulation, this form of apparatus can be used to determine the stray currents wandering through the earth, which, if plotted on a map or otherwise analyzed, will point to the source of such currents or suggest measures to mitigate the damage they may cause.

I claim:

1. The method of determining the potential difference between a buried metal structure and a point in the earth which includes placing a conductor in known capacitative relation with that point, connecting the conductor to the buried metal structure, and measuring the quantity of electricity that flows through the connection as a result of said potential difference.

2. The method of determining the potential difference between a buried metal structure and a point in the earth which includes placing a conductor in capacitative relation to the earth at that point but insulated therefrom, measuring the capacitance between the conductor and the earth, and measuring the quantity of electricity which flows between the buried metal structure and the conductor upon establishment of a connection therebetween.

3. The method of determining the potential difference between a buried metal structure and a point in the earth which includes the insertion of an insulated conductor at that point in the earth, and the measurement of the quantity of the transient current that flows in one direction upon connection of the conductor with the buried metal structure.

4. The method of determining the potential difference between two points in the earth which includes the steps of forming a capacitance between a conductor and the earth at each of said points simultaneously, and measuring the resultant direct current voltage between the conductors.

5. The method of determining the polarity of the potential difference between a buried metal structure and a point in the earth which includes placing a conductor in capacitive relation to that point, connecting the conductor to the buried metal structure, and determining the direction of flow of electricity through the connection as a result of said potential difference.

6. The method of determining the polarity of the potential difference between two points in the earth which includes the steps of forming a capacitance between a conductor and the earth at each of said points simultaneously, and determining the polarity of the resultant voltage between the conductors.

7. The method of determining the potential difference due to direct current between two points, at least one of the points being in the earth and in electrical relation thereto, which includes the steps of forming a capacitance between the earth and a conductor at the other point, and evaluating the direct current potential between the conductor and the said one point.

8. As a method of determining the potential difference between a point in the earth and a buried metal structure, the steps of forming a condenser of which one plate is formed of the earth at said point and the other plate is connected to said structure, and evaluating the potential difference between the said one plate and the buried metal structure.

9. As a method of determining the potential difference between a point in the earth and a buried metal structure, the steps of forming a condenser of which one plate is formed of the earth at said point, connecting the other plate to the structure, and evaluating the resultant potential across the plates of the condenser.

HERBERT BLASIER.